Sept. 19, 1967      R. P. MASSEY      3,343,007

MARX-TYPE IMPULSE GENERATOR

Filed Sept. 23, 1964

INVENTOR
R. P. MASSEY
BY
Walter M. Hiel
ATTORNEY 3,343,007
MARX-TYPE IMPULSE GENERATOR
Richard P. Massey, Westfield, N.J., assignor to Bell Telephone Laboratories, Incorporated, New York, N.Y., a corporation of New York
Filed Sept. 23, 1964, Ser. No. 398,800
6 Claims. (Cl. 307—108)

This invention relates to an improved impulse generator of the Marx-type.

Impulse generators have been used in the past for providing high voltages for testing insulators as well as for supplying power to X-ray apparatus. More recently such generators have been employed as modulators for high voltage tubes used in various kinds of transmitters, particularly those used for transmitting data in digital form. Marx generators consist of a plurality of stages which contain reactors that are charged in parallel and, through a switching means, are caused to discharge in series through a load circuit. The output voltage of prior art generators usually approximates the product of the source voltage and the number of stages. Where these generators are used as modulators for which the switching intervals must be closely regulated, a substantial increase in reliability becomes imperative. Reliability is improved as the circuit is simplified in structure and as its components are each individually made more reliable. Simplification is further achieved if the output voltage can be made greater than the product of the source voltage and the number of stages since in this case the number of stages is reduced.

It is an object of this invention to improve the reliability of impulse generators of the Marx-type.

A further object is to generate higher voltages than normally obtainable from a given number of generator stages.

A still further object is to increase the ratio of the output voltage to the blocking voltage capability of the switch used to control the generator.

The foregoing objects are achieved by this invention which comprises a high voltage generator of the Marx-type comprising a plurality of stages, each of which includes a transformer. The primary windings of the transformers are connected in parallel through individual capacitors and this parallel circuit is connected across a direct current source through an impedance. Each secondary winding is connected in series with a capacitor and a diode. The diodes are, in turn, connected in series with each other so that a high voltage pulse is generated across them in their reverse direction when a single switch shorts the parallel-connected primary circuit.

Figure 1:
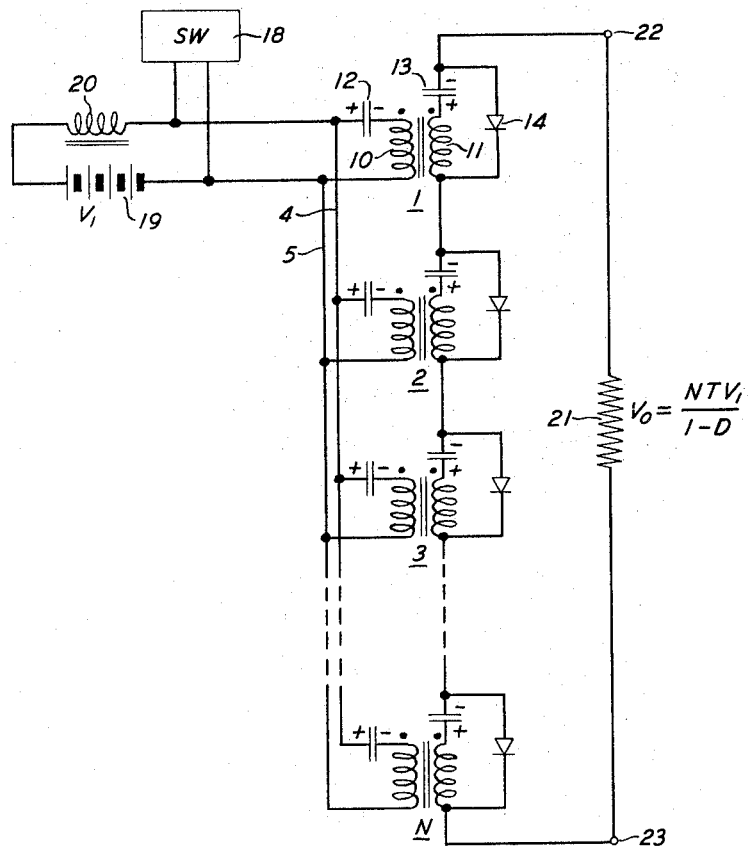

The invention may be better understood by reference to the accompanying drawings, in which:

FIG. 1 discloses a preferred embodiment of the invention; and

Figure 2:
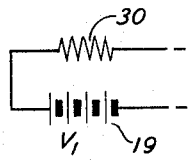

FIG. 2 discloses an alternative form of impedance which may be used in series with the direct current source.

FIG. 1 discloses a plurality of stages 1, 2, 3, N, each comprising a transformer having a primary winding 10 and a secondary winding 11. These stages are preferably, although not necessarily, identical and their transformers will provide a voltage step up. Identical stages are assumed in FIG. 1 so that each secondary has T times as many turns as does its primary. The primary circuit of each transformer comprises a capacitor 12 connected in series with the primary winding 10 and the primary circuits are connected in parallel by way of conductors 4 and 5. This parallel circuit is connected to a source of direct voltage 19 through an impedance which is disclosed in FIG. 1 as an inductor 20. A switching means 18 is connected across the parallel circuit. This switching means may be of any suitable type capable of placing momentary short circuits across the primary circuit as required by the modulation to be performed.

Each secondary circuit is identical to that shown for stage 1 which shows secondary winding 11 connected in series with a capacitor 13 and a diode 14. It will be evident that in the conductive direction of diode 14, a pulse from secondary 11 will charge capacitor 13 to the polarity indicated in the figure. The several series-connected secondaries and capacitors are connected in series and to a pair of output terminals 22, 23 to which is connected a suitable load 21.

The output voltage $V_0$ developed across load 21 can be shown to be $$V_0 = NTV_1/(1-D) \qquad (1)$$

where:

$N$ = the number of stages
$T$ = transformation ratio of the transformers
$V_1$ = voltage of source 19
$D$ = duty cycle of switching means 18.

As indicated by the above expression, the output voltage is proportional to the product of the number of stages, the voltage transformation ratio of the transformers and the supply voltage of source 19 and inversely proportional to a function of the duty cycle of the switch. The duty cycle of the switch is defined as the fraction of the total operating cycle that the switch is closed and, therefore, varies between zero and unity. In practice, the value of $D$ cannot be either zero or unity, for if the duty cycle is zero the switch is never closed and if the duty cycle is unity the switch is never opened. The practical values for the duty cycle generally range from 0.1 to 0.5. It is, therefore, evident that the output voltage will be larger than that which would be normally obtained from the transformer ratio and the number of stages employed.

The operation of the circuit of FIG. 1 is somewhat similar to that of the conventional Marx generators in the sense that when switch 18 is open capacitors 13 are effectively charged in parallel from source 19 and when switch 18 is closed they are discharged in series with the output circuit. When switch 18 is open, current from source 19 will charge capacitor 12 through inductor 20 and the primary winding 10 of the transformer. Noting the polarity dots at the top of the transformer, it will be evident that the voltages generated in both windings will be positive toward the dots during the charging operation so that the stepped up voltage in the secondary 11 will charge capacitor 13 to a high voltage in the polarity indicated by a current flowing through the shunting diode 14. This occurs in all of the transformers simultaneously since the primary circuits are all connected in parallel by way of conductors 4 and 5. When switch 18 is closed, capacitors 12 discharge through their primary windings to develop a high voltage in the secondary windings 11 in a direction to aid the voltage charge on their series capacitors 13. The shunting diodes 14 are back-biased and rendered nonconductive during this discharge interval. The sum of the voltages of all of the capacitors 13 and the pulses generated in the secondary windings 11 is now impressed across output terminals 22 and 23 and across load 21.

In practice, switch 18 may be the modulating switch of any conventional traveling wave tube modulator or the equivalent switch used in controlling the high voltage generator of X-ray or insulator testing apparatus.

The impedance 20 of FIG. 1 need not necessarily be an inductor but it must have a conductive path. In applications, such as insulator test circuits where the duty cycle is small and the total time for each operating cycle is long and usually quite irregular, the impedance may be the resistor 30 shown in FIG. 2 rather than an inductor.

From the foregoing description, it is evident that this invention embodies circuits somewhat different from the conventional Marx generator, such as those exemplified by Patent 1,957,008 granted May 1, 1934, to A. Brasch et al., and Patent 1,997,064 granted April 9, 1935, to J. T. Lusignan. Reliability of operation is considerably improved in that, for a given voltage to be generated, fewer stages are needed each containing stable circuit components and the control is relegated to a single switch which can be made highly reliable by redundancy, if necessary. This switch, being placed in the low voltage side of the circuit, may have a very much higher ratio of output voltage to blocking voltage capability, i.e., the voltage $V_B$ which it must block is equal to the output voltage $V_0$ reduced by the product of the number of stages and the transformation ratio of the transformers as indicated by the following expression $$V_B = V_0/NT \quad (2)$$

These are distinct practical advantages of this invention over the prior art.

Although the invention has been described with particular reference to specific embodiments thereof, other embodiments will readily occur to one skilled in the art without departing from either the spirit or the scope of the invention.

What is claimed is:

1. An impulse generator circuit comprising a plurality of stages, each stage including a transformer having a primary winding and a secondary winding, a capacitor connected in series with said primary winding to form a primary circuit, a second capacitor and a diode connected in series with said secondary winding, means connecting the primary circuits of said stages in parallel, other means connecting the second capacitors and secondary windings of said stages in series, means including an impedance for connecting said primary circuits to a current source, and a switch connected across said primary circuits.

2. The combination of claim 1 wherein the impedance in said means for connecting said primary circuits to a current source comprises an inductor.

3. The combination of claim 1 wherein the impedance in said means for connecting said primary circuits to a current source comprises a resistor.

4. An impulse generator comprising a plurality of transformers each having primary and secondary windings, means including capacitive means for connecting said primary windings in parallel, an impedance means for connecting said parallel connected primary windings to a source of electric current, a plurality of diodes and capacitors, other means connecting each secondary winding to one of said diodes in series with one of said capacitors, a pair of output terminals, means connecting said diodes in series between said output terminals, and a switching means connected across said primary circuits for discharging said capacitive means in said primary windings.

5. The combination of claim 4 wherein said impedance means comprises an inductor.

6. The combination of claim 4 wherein said impedance means comprises a resistor.

References Cited

UNITED STATES PATENTS

| | | | |
|---|---|---|---|
| 1,957,008 | 5/1934 | Brasch et al. | 307—108 |
| 1,997,064 | 4/1935 | Lusignan | 307—108 |
| 2,838,691 | 6/1958 | Zavales | 307—110 |
| 2,916,640 | 12/1959 | Pearson | 307—106 |
| 3,168,701 | 2/1965 | Foitzik | 328—78 XR |

MILTON O. HERSHFIELD, *Primary Examiner.*

D. F. DUGGAN, *Assistant Examiner.*